Figure 1:
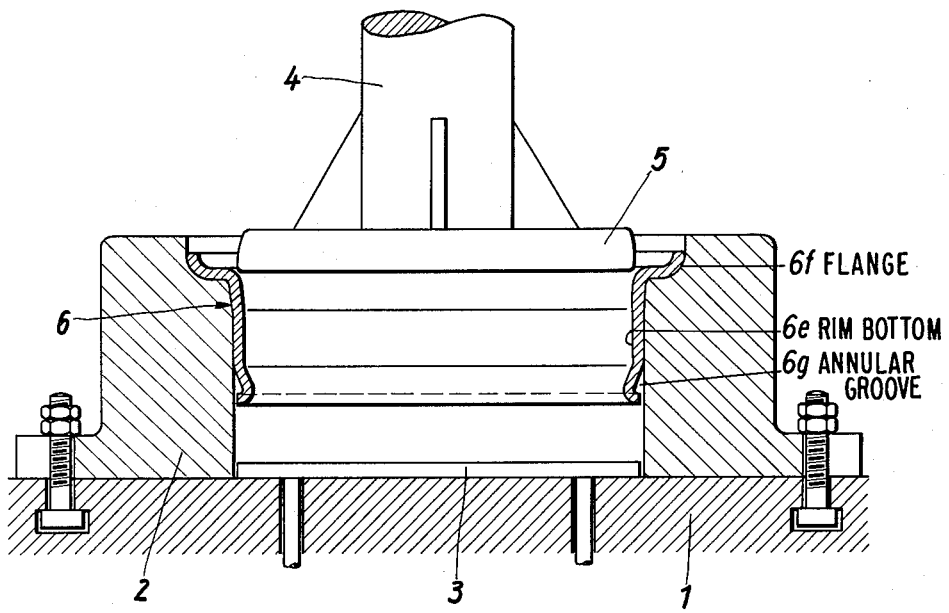

July 5, 1966  A. SCHÜTTLER  3,258,833
METHOD AND APPARATUS FOR MAKING RIMS FOR VEHICLE WHEELS
HAVING PNEUMATIC TIRES
Filed Dec. 15, 1961  3 Sheets-Sheet 1

Inventor
Artur Schüttler
By his attorneys
Howson and Howson

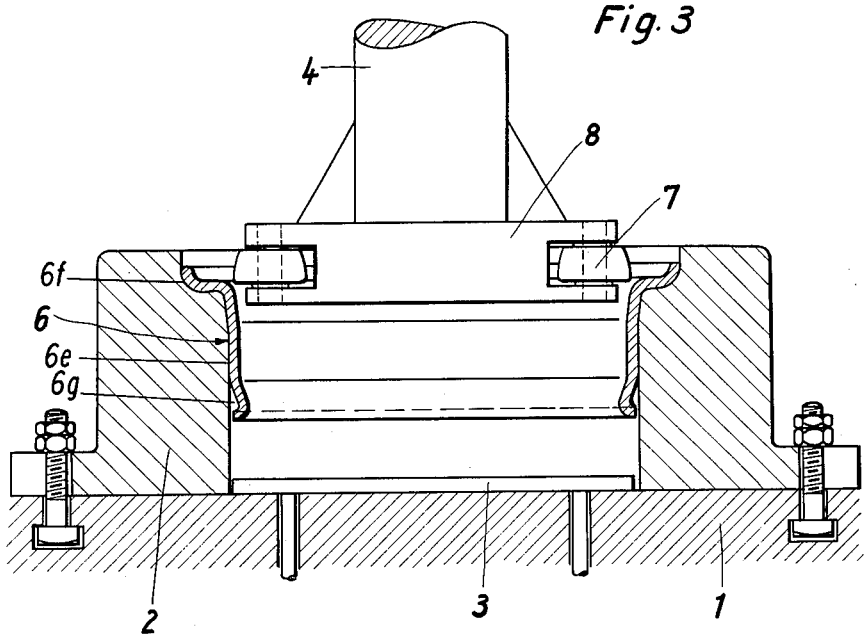
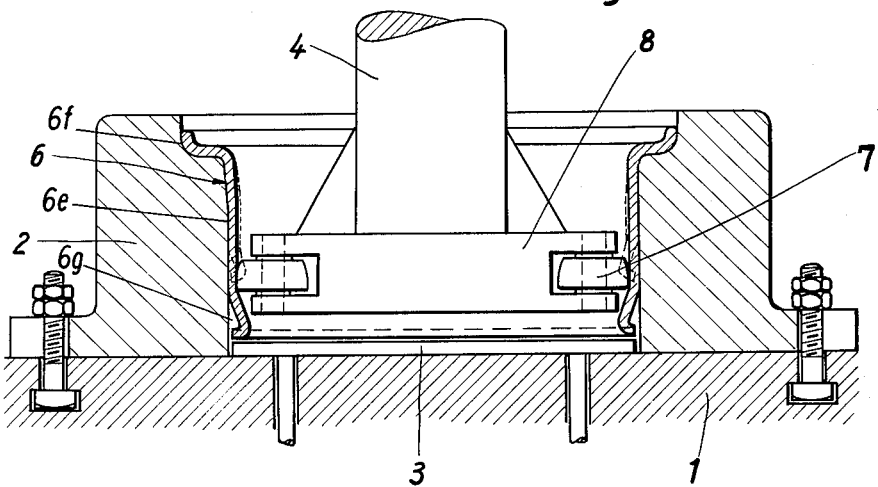

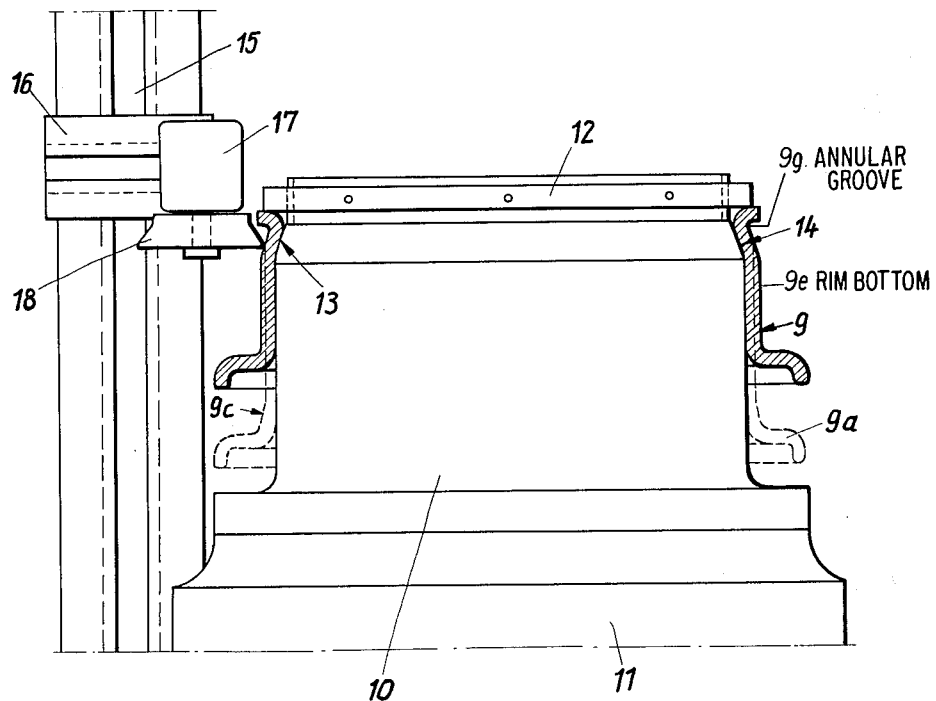

3,258,833
METHOD AND APPARATUS FOR MAKING RIMS FOR VEHICLE WHEELS HAVING PNEUMATIC TIRES
Artur Schüttler, Solingen-Ohligs, Germany, assignor to Kronprinz Aktiengesellschaft, Solingen-Ohligs, Germany, a corporation of Germany
Filed Dec. 15, 1961, Ser. No. 159,528
Claims priority, application Germany, Dec. 15, 1960, K 42,394; June 29, 1961, K 44,125
7 Claims. (Cl. 29—159.1)

It is known in the art to manufacture rims for vehicle wheels having pneumatic tires from cylindrical sheet-metal rings by profile shaping deformation. Such rims produced by means known per se show in all zones of the profiles a constant wall thickness. The mechaical stresses of the different profile zones occurring in the operating practice, however, deviate considerably from each other. The stresses are substantially less in the region of the rim bottom than on the passages to the wheel flanges and—in the case of longitudinally divided rims—in the region of the annular groove serving to receive the sealing ring.

The object of my invention is to adapt the wall thickness of the rims manufactured from metal-sheet rings through a new method to the variable stresses in the different profile zones.

The method in accordance with the invention comprises shaping at first an axially abridged profile from a sheet-metal ring of corresponding width and then stretching said profile out of its natural shape within the region of the zone or zones of least stress, in particular in the region of the rim bottom by reducing the wall thickness. In this manner, the overrating of the rim wall on the lesser stressed zones will be avoided and substantial reduction in weight will be attained with the aid of a very simple stretching-off method.

The stretching of the lesser stressed zone may be accomplished by various means in different ways.

In the first embodiment of an apparatus suitable for accomplishing the method in accordance with the invention a rigid annular mold having an inner tool movable in the direction of the axis of the mold is provided.

This inner tool may be developed as piston-like drawing tool which can be introduced into the annular mold in axial direction under pressure. The diameter of this tool is selected so as to form in cooperation with said annular mold an annular gap conforming to the desired wall thickness of the zone to be stretched off. The tool is only lowered into the annular mold to such an extent as the zone to be stretched off reaches and is subsequently withdrawn again.

The same effect will be attained with a tool using instead of a drawing piston some rotating pressure rollers supporting mutually, being in same manner lowered axially into the annular mold, whereby the mounting support for said pressure rolls likewise rotates.

A third embodiment of an apparatus particularly suitable for accomplishing the method in accordance with the invention comprises a mandrel fitting into preliminary shaped rim ring having a clamping device for said rim ring and an outer tool for stretching off the rim ring. As outer tool a drawing ring may be used, cooperating in accordance with the pattern of a tube jointer bench with the mandrel for stretching off the rim ring. However, it is more appropriate to provide as outer tool one or more stretching rollers parallel to the rotatable mandrel and adjustable transversally thereto.

The FIGURES 1 to 5 represent the afore-described types of embodiments of the devices in axial sections.

Figure 2:
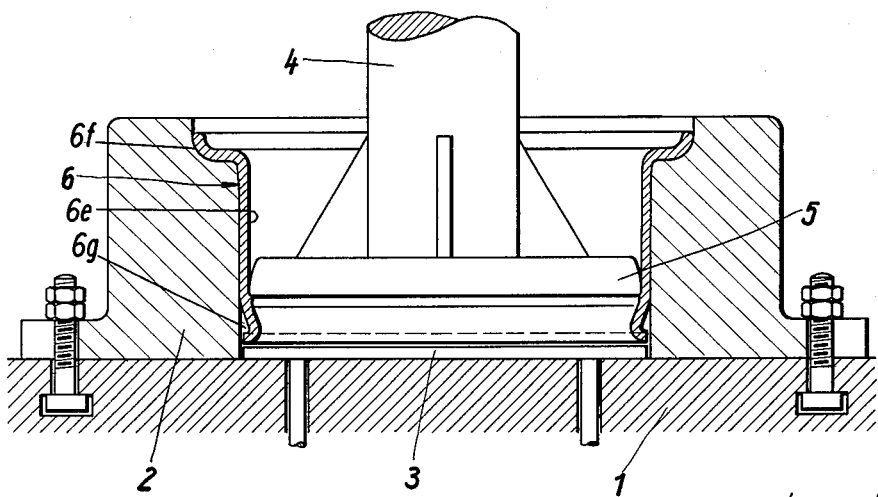

FIGURES 1 and 2 show an embodiment acting by means of a piston-like drawing tool before starting and after finishing the stretching-off operation, FIGURES 3 and 4 show the corresponding phases of operations when employing a rolling tool, whereas FIGURE 5 shows the third type of embodiment.

According to the novel method, a cylindrical tire ring having flanges of substantially final shape and profile is stretched out axially and simultaneously its thickness is progressively reduced by expanding one diameter while maintaining the other diameter, as illustrated in the drawings. In FIGS. 1–4 the inner diameter is stretched and expanded outwardly while maintaining the same outer diameter, thereby reducing the thickness of the tire rim. In FIG. 5 the outer diameter is reduced, while maintaining the inner diameter.

On a fixed base plate, e.g., on the table 1 of a vertical press having a slow stroke of the press die, a rigid annular mold 2 is stretched out, serving for the purpose of receiving the rim ring 6. Within the annular mold 2 the table 1 carries an ejector plate 3. On the press die which is not shown in the illustration, a vertical shaft 4 is supported concentrically to the annular mold 2, said shaft carrying on its lower end the piston-like drawing tool 5.

Rim ring 6 as shown in FIGS. 1 to 4 has a rim bottom 6e, flange 6f, and an annular groove or rim gutter 6g.

The rim ring 6 is manufactured in a manner known per se, from an annular metal sheet ring by profile shaping deformation showing an abridged profile. Then, the rim ring is inserted into the annular mold (compare FIG. 1). Thereupon, the press die (which is not represented in the illustration) is slowly moved downwardly with the vertical shaft 4 thereto attached and the piston-like drawing tool 5. The downward movement is finished on the shoulder of the annular groove (compare FIG. 2), the rim bottom was stretched-off during the downward motion through the contacting edges of the piston-like drawing tool and reaches its definitive width and thickness. After withdrawing the tool 5, the ready formed rim ring 6 is removed from the annular mold 2 with the aid of the ejector means 3.

In the embodiment according to the FIGS. 3 and 4 an arrangement of several mutually supporting pressure rolls 7 pivotally provided in a rotating disc-like mounting support 8 replaces the piston-like drawing tool. The mounting support 8 connected to a shaft 4 is again connected with the die of a press. During the downstroke of the press die mounting support 8 turns around its axis in such a manner that the rotating pressure rolls 7 effect an axial stretching of the profile zone forming the rim bottom of the rim ring 6.

In the embodiment according to FIG. 5 the rim ring 9 manufactured with abridged profile is set up on a mandrel 10 adapted to the profile mold and rotatably supported in a headstock 11 customary in a stretching roller device. Through a ring 12 acting on the front side against the rim ring 9, the rim ring 9 is clamped on the mandrel 10, whereby the hollow cone 13 of the rim ring 9 in the region of the annular groove 9g for the rim sealing ring is supported against a cone-like face 14 of the mandrel 10. In a slide radius link 15 extending parallel to the mandrel 10, a cross slide 16, 17 is movable. The shiftable portion 17 of the cross slide movable transversally to the mandrel 10 carries a stretcher roller 18 on an axis extending parallel to the mandrel 10.

For stretching off the rim ring 9 until attaining the definitive rim profile represented by dotted lines at 9a, the mandrel 10 with the set up rim ring is rotated by means not shown in the drawing. The portion 17 of the cross slide is radially adjusted to the mandrel 10 in such a manner that the distance between the circumference of the stretching roller and the mandrel conforms to the final thickness of the rim bottom.

Then, the cross slide is moved along the radius link 15 by means known per se but likewise not represented in the drawing. If manufacturing rims having inclined shoulders 9c is concerned, at the same time with the shifting in the region of the inclined shoulder a transversal motion of the portion 17 of the cross slide occurs corresponding to the conical form of the inclined shoulder of the portion 17 of the cross slide, by means of controlling and operating means not shown in the drawing.

I claim:
1. A method of manufacturing a rim for pneumatic-tired vehicle wheels by deformation of a sheet metal ring, consisting in first shaping from a sheet metal ring of corresponding width an axially abridged rim profile having a rim bottom extending axially between an annular groove and a flange in their final form, and then simultaneously stretching progressively said rim bottom and progressively deforming and reducing the thickness of successive portions of the ring bottom by expanding one wall of said rim bottom while holding and maintaining the other wall of the rim bottom, whereby the rim bottom profile is brought to its final dimensions.

2. A method as claimed in claim 1 wherein the original circumference of the outer wall is held and maintained.

3. A method as claimed in claim 1 wherein the original circumference of the inner wall is held and maintained.

4. A method of manufacturing a rim for pneumatic-tired vehicle wheels by deformation of a sheet metal ring, consisting in first shaping from a sheet metal ring of corresponding width an axially abridged rim profile having a rim bottom extending axially between an annular groove and a flange in their final form, and then simultaneously stretching progressively said rim bottom and progressively deforming and expanding successive portions of one wall of said rim bottom while holding and maintaining the other wall of the rim bottom and progressively reducing the thickness of said successive portions, whereby the rim bottom profile is brought to its final dimensions.

5. Apparatus for manufacturing a rim for pneumatic-tired vehicle wheels by deformation of a sheet metal ring, consisting in means for first shaping from a sheet metal ring of corresponding width an axially abridged rim profile having a rim bottom extending axially between an annular groove and a flange in their final form, and means for then simultaneously stretching progressively said rim bottom and for progressively deforming and reducing the thickness of successive portions of the ring bottom by expanding one wall of said rim bottom while holding and maintaining the other wall of the rim bottom whereby the rim bottom profile is brought to its final dimensions.

6. Apparatus as claimed in claim 5 wherein the original circumference of the outer wall is held and maintained.

7. Apparatus as claimed in claim 5 wherein the original circumference of the inner wall is held and maintained.

References Cited by the Examiner

UNITED STATES PATENTS

| | | | |
|---|---|---|---|
| 1,809,605 | 6/1931 | Sauzedde | 29—159.1 |
| 1,826,449 | 10/1931 | Booth | 29—159.1 |
| 1,922,088 | 8/1933 | Hiester | 72—115 |
| 1,968,296 | 7/1934 | Hiester | 72—115 |
| 2,159,371 | 5/1939 | Brink | 29—159.1 |
| 3,029,667 | 4/1962 | Sporck | 72—105 |
| 3,129,496 | 4/1964 | Cox | 29—159.01 |
| 3,181,329 | 5/1965 | Sporck | 72—85 |

JOHN F. CAMPBELL, *Primary Examiner.*

NEDWIN BERGER, *Examiner.*

THOMAS H. EAGER, S. C. KAHLER,
*Assistant Examiners.*